United States Patent
Kitagata (10) Patent No.: US 12,095,644 B2
(45) Date of Patent: Sep. 17, 2024

(54) NETWORK DEVICE AND CONTROL METHOD THEREOF

(71) Applicant: CANON KABUSHIKI KAISHA, Tokyo (JP)

(72) Inventor: Kei Kitagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 17/686,722

(22) Filed: Mar. 4, 2022

(65) Prior Publication Data

US 2022/0294720 A1    Sep. 15, 2022

(30) Foreign Application Priority Data

Mar. 9, 2021 (JP) ................................. 2021-037644

(51) Int. Cl.
*H04L 43/103* (2022.01)
*H04L 43/16* (2022.01)
*H04L 67/55* (2022.01)

(52) U.S. Cl.
CPC ............ *H04L 43/103* (2013.01); *H04L 43/16* (2013.01); *H04L 67/55* (2022.05)

(58) Field of Classification Search
CPC ........ H04L 43/103; H04L 43/16; H04L 67/55
See application file for complete search history.

(56) References Cited

U.S. PATENT DOCUMENTS

| | | | |
|---|---|---|---|
| 9,172,617 B2* | 10/2015 | Kaneko | H04N 1/00344 |
| 2013/0010693 A1* | 1/2013 | Luna | H04L 67/62 |
| | | | 370/328 |
| 2014/0082173 A1* | 3/2014 | Kaneko | H04N 1/00344 |
| | | | 709/223 |
| 2018/0091553 A1* | 3/2018 | Mandyam | H04L 63/1433 |
| 2019/0108251 A1* | 4/2019 | Yared | G06F 16/2379 |

FOREIGN PATENT DOCUMENTS

JP           5721659 B2    5/2015

* cited by examiner

*Primary Examiner* — James E Springer
*Assistant Examiner* — Patrick F Ngankam
(74) *Attorney, Agent, or Firm* — Venable LLP (57) ABSTRACT

A network device transmits, to a server, information of an event that has occurred in the network device, compares, with each of a first threshold and a second threshold greater than the first threshold, a metric that corresponds to a state of the network device pertaining to the event, and switches a method of communicating with the server based on the comparison. When the metric exceeds the first threshold while communicating with the server in a polling method with first communication intervals and is smaller than the second threshold, the method of communicating with the server switches to a polling method with second communication intervals that are shorter than the first communication intervals, and when the metric exceeds the second threshold while communicating with the server in the polling method with the second communication intervals, the method of communicating switches with the server to a push method.

14 Claims, 9 Drawing Sheets

NETWORK DEVICE AND CONTROL METHOD THEREOF

BACKGROUND OF THE INVENTION

Field of the Invention

The present invention relates to a network device and a control method thereof.

Description of the Related Art

A form of cloud computing, in which servers provide services to clients, is attracting attention. Also, "Internet of Things, IoT", in which many devices connected to the Internet are controlled and various data are collected from these devices, has started to become popular. Devices connected to the Internet can be clients of cloud computing. Many devices, such as multifunctional devices, projectors, and network cameras, operate as clients in an office environment and transmit data to servers on the cloud. A cloud service, which manages devices by actively sending commands from servers to clients, has also been implemented. Such commands are also called push commands. Servers can control clients by transmitting push commands to the clients. For example, a server can cause a client to upload a log to the server in real time when an error occurs, or can remotely instruct the client to restart. There are two communication methods for transmitting push commands: a polling method and a push method. In the polling method, clients periodically query servers for the presence or absence of push commands, and in response, the servers transmit push commands. In the push method, servers transmit push commands through a pre-established session. Japanese Patent No. 5721659 discloses a network device for switching between the polling method and the push method in consideration of a predetermined condition.

SUMMARY OF THE INVENTION

If a client is communicating with a server by the push method, in order to maintain a session with the server, the client will not be able to enter a sleep state. Therefore, the power consumption of the client increases. On the other hand, if the client is communicating with the server in the polling method, since the client will not be able to receive push commands from the server in a timely manner, it may not be possible to sufficiently manage the client. An aspect of the present disclosure provides a technique for appropriately switching a method of communication between a network device and a server.

In some embodiments, a network device operable to communicate with a server includes a transmitting unit configured to transmit, to the server, information of an event that has occurred in the network device, a comparison unit configured to compare, with each of a first threshold and a second threshold that is greater than the first threshold, a metric that corresponds to a state of the network device pertaining to the event, and a switching unit configured to switch a method of communicating with the server based on a result of the comparison by the comparison unit. The switching unit is configured to, in a case where the metric exceeds the first threshold while communicating with the server in a polling method with first communication intervals, switch the method of communicating with the server to a polling method with second communication intervals that are shorter than the first communication intervals, and in a case where the metric exceeds the second threshold while communicating with the server in the polling method with the second communication intervals, switch the method of communicating with the server to a push method.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

Figure 1:
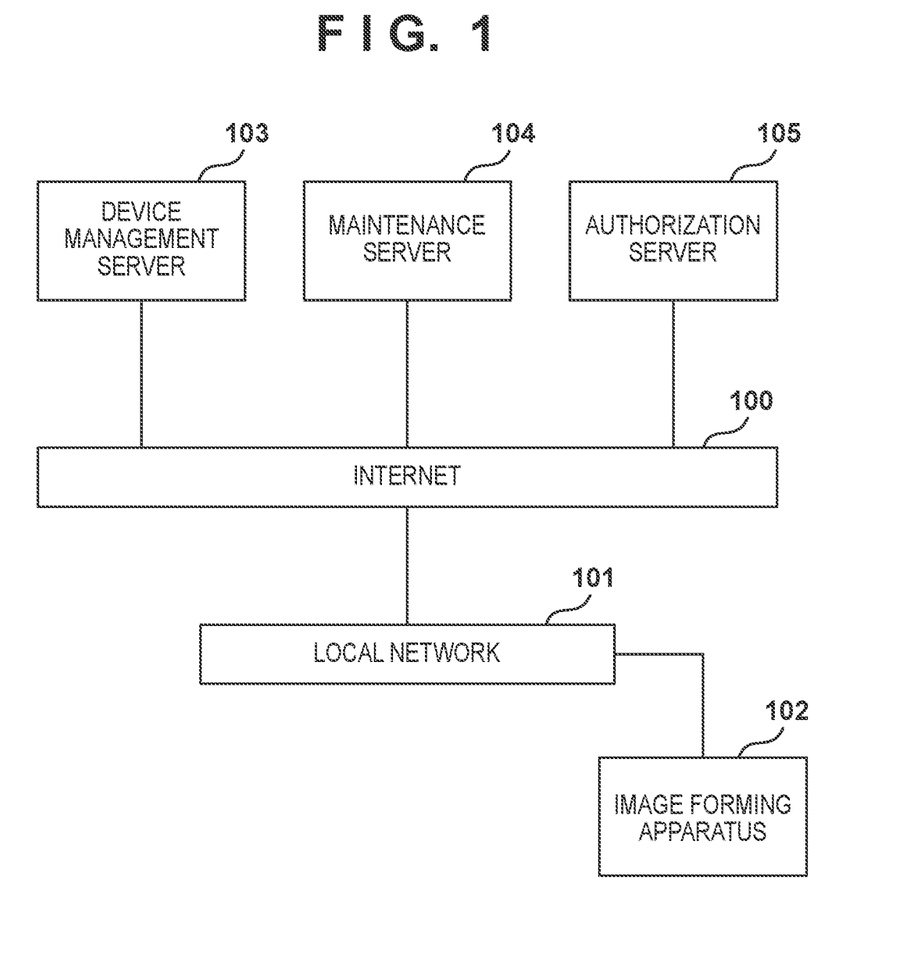
FIG. 1 is a block diagram illustrating an example of an overall configuration of a remote maintenance system of a first embodiment.

Referring to FIG. 1, description will be given for an overall configuration of a remote maintenance system related to a first embodiment. The remote maintenance system includes, for example, an image forming apparatus 102, a device management server 103, a maintenance server 104, and an authorization server 105. The image forming apparatus 102 may be an MFP (an abbreviation for Multifunction Peripheral) having a printer function for printing images on printing media such as paper or a scanner function for reading images from documents. Since the image forming apparatus 102 can execute various processes for images, it may be referred to as an image processing apparatus. The image forming apparatus 102 accesses the Internet 100 via a local network 101 such as a LAN (an abbreviation for Local Area Network). As such, the image forming apparatus 102 functions as a network device. The device management server 103, the maintenance server 104 and the authorization server 105 are also connected to the Internet 100. The apparatuses included in the remote maintenance system can communicate with each other via the Internet 100.

The device management server 103 is a server that manages IoT devices, and controls push commands to be transmitted to the IoT devices, or receives information (hereinafter, referred to as event information) related to events of the IoT devices. IoT devices can also be referred to as clients. The image forming apparatus 102 is one of the clients managed by the device management server 103. The device management server 103 receives push command requests from the maintenance server 104 and issues push commands to the client.

The maintenance server 104 is a server that performs maintenance processing of the image forming apparatus 102 remotely. The maintenance server 104 creates, for example, commands for remotely performing maintenance of the image forming apparatus 102. As an example of the remote maintenance processing, there is processing in which, at the time of failure in the image forming apparatus 102, an operator operates an information terminal at a location that is remote from the image forming apparatus 102 to send an instruction to the image forming apparatus 102 via the device management server 103 and cause the image forming apparatus 102 to recover from failure.

The authorization server 105 is a server that issues and manages authorization tokens, which are necessary for the image forming apparatus 102 to access the device management server 103. The device management server 103 and the maintenance server 104 belong to the security domain of the authorization server 105. The image forming apparatus 102 needs an authorization token issued by the authorization server 105 to make a request to the device management server 103 or the maintenance server 104. The device management server 103 and the maintenance server 104 process a request only if the validity of the authorization token is verified. Validity checks for authorization tokens include expiration date checks and license checks.

In FIG. 1, only one image forming apparatus 102, device management server 103, maintenance server 104, and authorization server 105 are illustrated, but any of these apparatuses may be a plurality. Each of the device management server 103, the maintenance server 104, and the authorization server 105 may be exposed to the Internet 100 as a cloud service, made redundant with a plurality of physical servers.

Hardware Configuration of Image Forming Apparatus 102

Figure 2A:
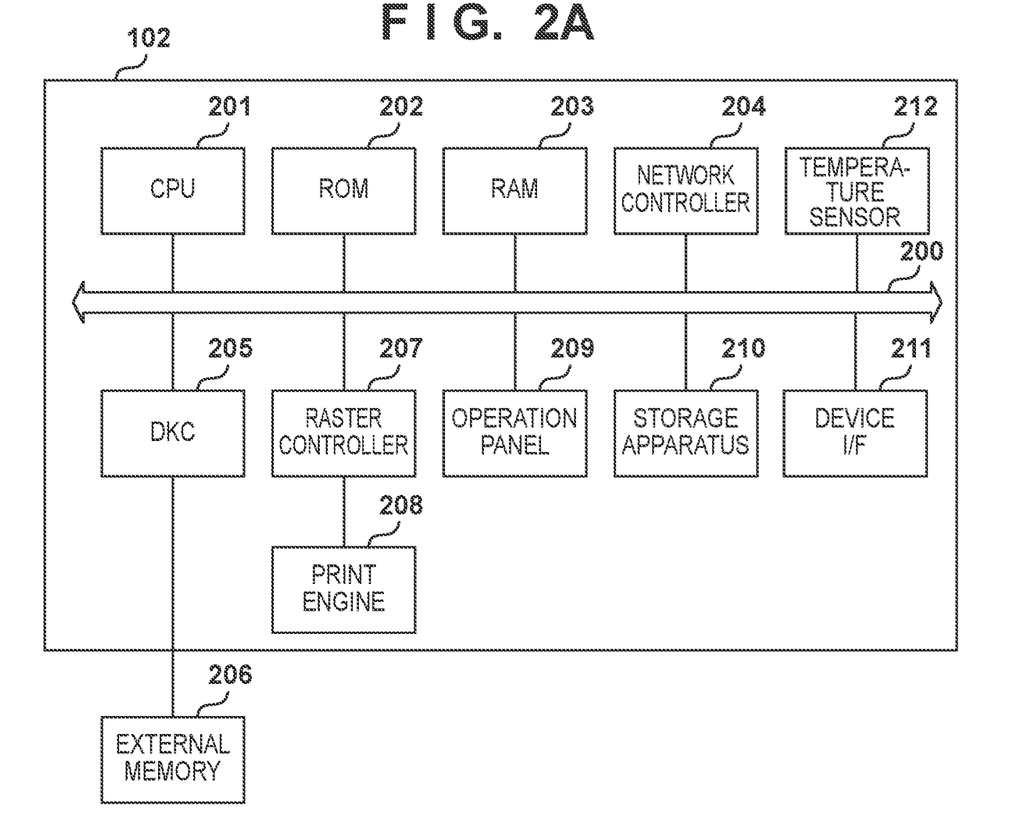
FIGS. 2A and 2B are block diagrams illustrating examples of hardware configurations of respective apparatuses of the first embodiment.

FIG. 2A illustrates a hardware configuration diagram of the image forming apparatus 102. The image forming apparatus 102 may include all of the components illustrated in FIG. 2A. Alternatively, some components in FIG. 2A may be omitted, or the image forming apparatus 102 may have additional components. Each component of the image forming apparatus 102 is connected to a system bus 200.

A CPU (an abbreviation for Central Processing Unit) 201 is a processing circuit that performs control of the entire image forming apparatus 102. For example, the CPU 201 comprehensively controls the access to and from various devices connected to the system bus 200. Control by the CPU 201 may be performed in accordance with a control program and the like stored in a ROM (an abbreviation for Read Only Memory) 202. Control by the CPU 201 may be performed in accordance with a control program, resource data (resource information), and the like stored in an external memory 206 connected via a disk controller (DKC) 205.

A RAM (an abbreviation for Random Access Memory) 203 is a memory that functions as a main memory, a work area, and the like of the CPU 201. The memory capacity of the RAM 203 may be expandable by an optional RAM connected to an expansion port (not shown).

A storage apparatus 210 is an external storage apparatus that functions as a mass memory, and may store a program to be described later according to the present embodiment. An operation panel 209 (operation unit) is a device that displays a screen and receives a user's operation instructions via the screen. Buttons and a display unit such as a liquid crystal panel may be disposed on the operation panel 209 for setting operation modes and the like of the image forming apparatus 102, displaying the operation status of the image forming apparatus 102, and performing operations such as copy designation. A network controller 204 is a device for communicating data with external devices and is, for example, a network interface card (NIC).

A print engine 208 is a device for performing printing on printing media. In the print engine 208, printing may be performed using a known printing technique; for example, an electrophotographic method (laser beam method), an inkjet method, a sublimation (thermal-transfer) method, or the like is utilized. A raster controller 207 is a controller that converts, into image data, print data specified in a PDL (an abbreviation for page description language) language, a PDF (an abbreviation for Portable Document Format) language, or the like. A device I/F (an abbreviation for Interface) 211 is an interface for connecting to external devices by USB (an abbreviation for Universal Serial Bus) or the like. A temperature sensor 212 is a sensor for measuring an internal temperature of the image forming apparatus 102.

Hardware Configuration of Device Management Server 103

Figure 2B:
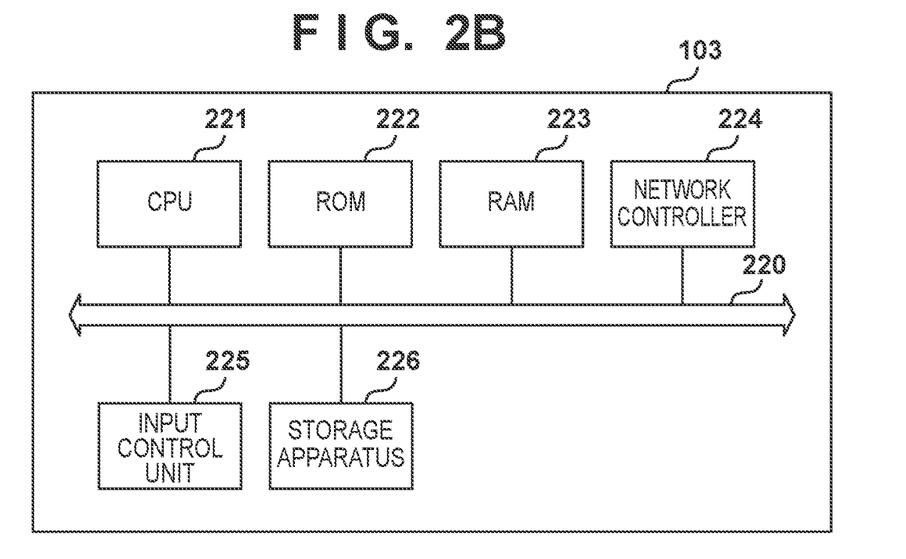

FIG. 2B illustrates a hardware configuration diagram of the device management server 103. Since the hardware configurations of the maintenance server 104 and the authorization server 105 may be the same as that of the device management server 103, redundant description will be omitted. The device management server 103 may be a single device or a system comprising a plurality of devices. The device management server 103 may be a system that is interconnected via a network such as a LAN or a WAN (an abbreviation for Wide Area Network) and performs processing. The device management server 103 may include all of the components illustrated in FIG. 2B. Alternatively, some components in FIG. 2B may be omitted, or the device management server 103 may have additional components. Each component of the device management server 103 is connected to a system bus 220.

A CPU 221 is a processing circuit for controlling the entire device management server 103. For example, the CPU 221 executes application programs, an operating system, and a device management system program described later, which are stored in a storage apparatus 226. Further, the CPU 221 controls temporary storing of information, files, and the like used for executing programs in a RAM 223. A ROM 222 is a memory for storing programs such as a basic I/O (an abbreviation for Input/Output) program and various types of data. The RAM 223 is a temporary storage memory that functions as a main memory, a work area, and the like of the CPU 221. An input control unit 225 is a device that controls input to the device management server 103. The device management server 103 exchanges data with external devices via the input control unit 225.

A network controller 224 is a device for communicating data with external devices and is, for example, a network interface card. The storage apparatus 226 is one of the external storage apparatuses and functions as a mass memory. The storage apparatus 226 stores application programs, an operating system (OS), and the like.

Software Configuration of Device Management Server 103

Figure 3A:
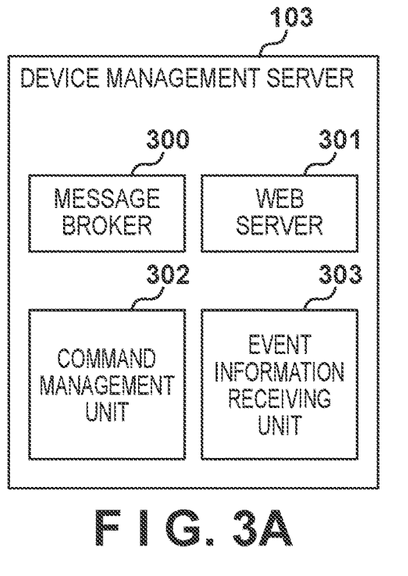
FIGS. 3A to 3D are block diagrams illustrating examples of software configurations of respective apparatuses of the first embodiment.

FIG. 3A is a software configuration diagram of the device management server 103. Each software module illustrated in FIG. 3A is stored in the storage apparatus 226 illustrated in FIG. 2B and may be loaded and executed by the CPU 221 to the RAM 223 as previously described.

A message broker 300 provides various interfaces of the device management server 103 and verifies the validity of received information. The message broker 300 may provide an interface in a publish-subscribe (Pub/Sub) pattern protocol, which is capable of bidirectional communication, such as an MQTT (an abbreviation for Message Queue Telemetry Transport) protocol. Since the MQTT protocol can reduce transfer data size, it is suitable for continuously transmitting and receiving small amounts of data. The message broker 300 may use other protocols or communication methods that are capable of transmitting push commands originating at the device management server 103 instead of bidirectional communication, such as MQTT protocol.

A web server 301 provides various interfaces of the device management server 103 in an HTTP (an abbreviation for Hypertext Transfer Protocol) protocol and verifies the validity of received information. The HTTP protocol is a protocol used as a standard on the Web and is suitable for coordination between servers as well as between Web browsers and servers.

In the present embodiment, the message broker 300 and the web server 301 handle different protocols, but the functions provided by the device management server 103 on various interfaces are similar. A client (for example, the image forming apparatus 102) may select which protocol to use.

A command management unit 302 manages command information as illustrated in Table 1 below. The command management unit 302 generates a record in the command information for each command issued to a client. Each column of the command information will be described below. "Command ID" indicates an identifier (ID) for uniquely managing command information for a client. "Client ID" indicates an identifier that uniquely identifies a client to which the device management server 103 issues commands. A client ID corresponds to a client ID of client information to be described later issued by the authorization server 105. "Status" indicates a status of a command. A status becomes "ACCEPTED" when a client acquires a command and is "QUEUED" in a state before a command is acquired. Also, a command that a client cannot execute will become "ERROR". "Inputted Date & Time" indicates a date and time the device management server 103 received the command information sent from the maintenance server 104. "Command Content" indicates the content of a command executed by a client. "TTL" indicates a time (seconds) until a record becomes invalid. Records that have become invalid are deleted from the command information. The command management unit 302 transmits push commands to clients via the message broker 300 or the web server 301 based on the command information.

TABLE 1

| Command ID | Client ID | Status | Inputted Date & Time | Command Content | TTL (sec) |
|---|---|---|---|---|---|
| 11111 | ClientID_1 | QUEUED | YYYY/MM/DD | {"type": "power", "action": "off"} | 86400 |
| 22222 | ClientID_2 | ACCEPTED | YYYY/MM/DD . . . | | 86400 |
| 33333 | ClientID_3 | ERROR | YYYY/MM/DD . . . | | 86400 |

Figure 4:
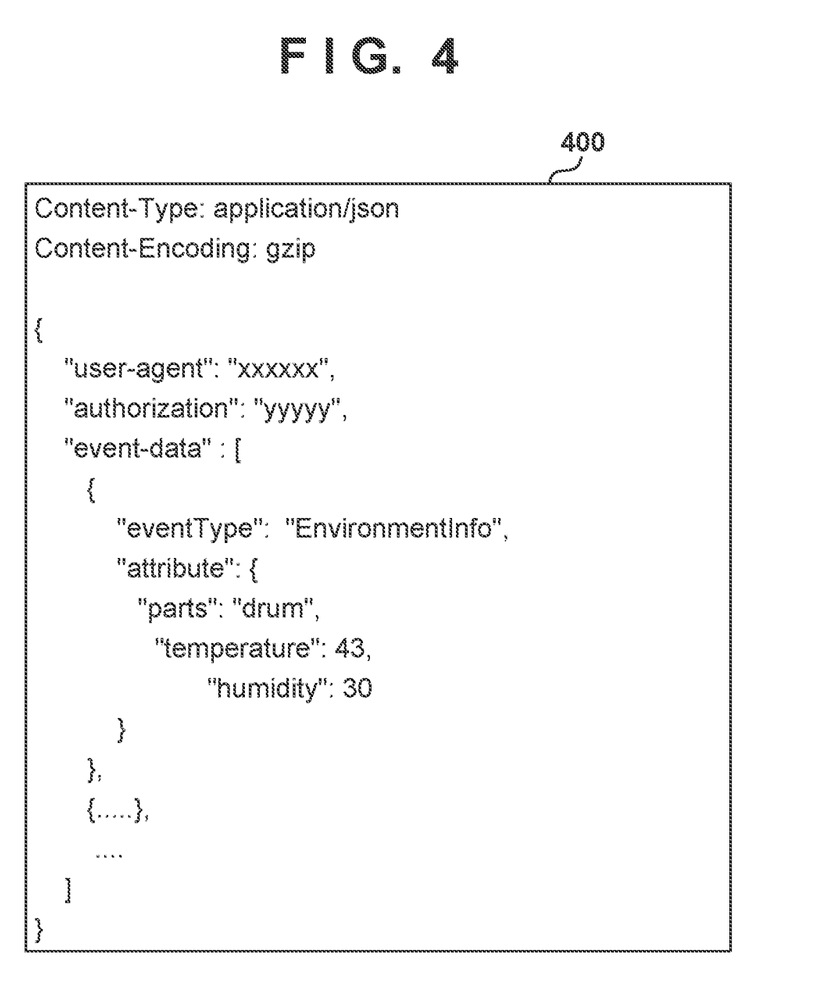
FIG. 4 is a diagram illustrating an example of event information of the first embodiment.

An event information receiving unit 303 receives event information from a client (for example, the image forming apparatus 102) and stores the event information in the storage apparatus 226. FIG. 4 illustrates an example of event information 400. Specific examples of event information will be described later.

Software Configuration of Maintenance Server 104

Figure 3B:
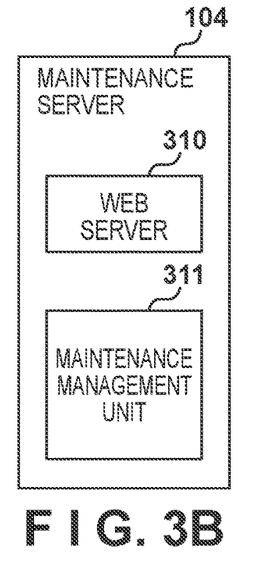

FIG. 3B is a software configuration diagram of the maintenance server 104. Each software module illustrated in FIG. 3B is stored in the storage apparatus 226 illustrated in FIG. 2B and may be loaded and executed by the CPU 221 to the RAM 223 as previously described.

A web server 310 provides various interfaces of the maintenance server 104 in the HTTP protocol and verifies the validity of received information. A maintenance management unit 311 remotely manages the image forming apparatus 102. For example, in order to resolve failure of the image forming apparatus 102 in a remote location, the maintenance management unit 311 resets the functions of the image forming apparatus 102 or restarts the image forming apparatus 102. Command information for performing such management is stored in the storage apparatus 226.

Software Configuration of Authorization Server 105

Figure 3C:
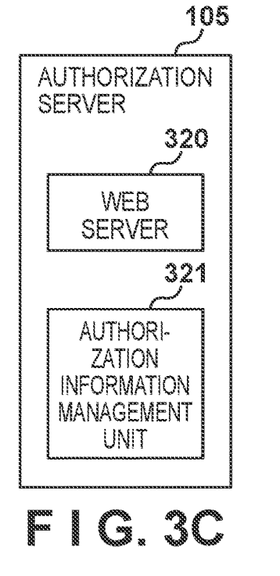

FIG. 3C is a software configuration diagram of the authorization server 105. Each software module illustrated in FIG. 3C is stored in the storage apparatus 226 illustrated in FIG. 2B and may be loaded and executed by the CPU 221 to the RAM 223 as previously described.

A web server 320 provides various interfaces of the authorization server 105 and verifies the validity of received information. An authorization information management unit 321 manages client information and authorization token information, and in response to a request received by the web server 320, issues authorization tokens, checks scope, and checks expiration dates. The information held by the authorization server 105 is stored in the storage apparatus 226.

Table 2 illustrates an example of client information. In the client information, information of clients who can access the device management server 103 is registered. The authorization information management unit 321 generates a record in the client information for each client. In the present embodiment, client information of an authorization client 334 and client information of the maintenance server 104 are registered.

Each column of the client information will be described below. "Client ID" indicates an identifier that uniquely identifies a client. "Password" indicates a password for determining the validity of a client. The authorization server 105 identifies a client by matching a client ID with a password. "Device ID" indicates an identifier of the image forming apparatus 102 when a client is the image forming apparatus 102. "Scope" indicates the scope of OAuth and represents the scope accessible by authorization tokens issued by the authorization server 105.

TABLE 2

| Client ID | Password | Device ID | Scope |
|---|---|---|---|
| ClientID_1 | ***** | DeviceID_1 | Scope_commands |
| ClientID_2 | ***** | DeviceID_2 | Scope_commands |
| ClientID_3 | ***** | DeviceID_3 | Scope_commands |

Table 3 illustrates an example of authorization token information. The authorization information management unit 321 registers a record in the authorization token information when the web server 320 receives an authorization token acquisition request. This record is managed using an authorization token as the primary key. "Authorization Token" indicates an authorization token issued for an authorization token acquisition request. "Expiration Date" indicates an expiration date of an authorization token, and a value after a certain time from the time at which the authorization token acquisition request was received is registered. An authorization token whose expiration date has passed is invalid. "Client ID" indicates an identifier of a client who has requested to acquire an authorization token from the authorization server 105. "Scope" indicates a scope in which an authorization token can be used and a scope that has been passed in a request to acquire an authorization token from the authorization server 105 is registered.

TABLE 3

| Authorization token | Expiration date | Clinet ID | Scope |
|---|---|---|---|
| XXXXXXXXXXXX | YYYY/MM/DD | ClientID_1 | Scope_commands |
| YYYYYYYYYYYY | YYYY/MM/DD | ClientID_2 | Scope_commands |
| ZZZZZZZZZZZZ | YYYY/MM/DD | ClientID_3 | Scope_commands |

Software Configuration of Image Forming Apparatus 102

Figure 3D:
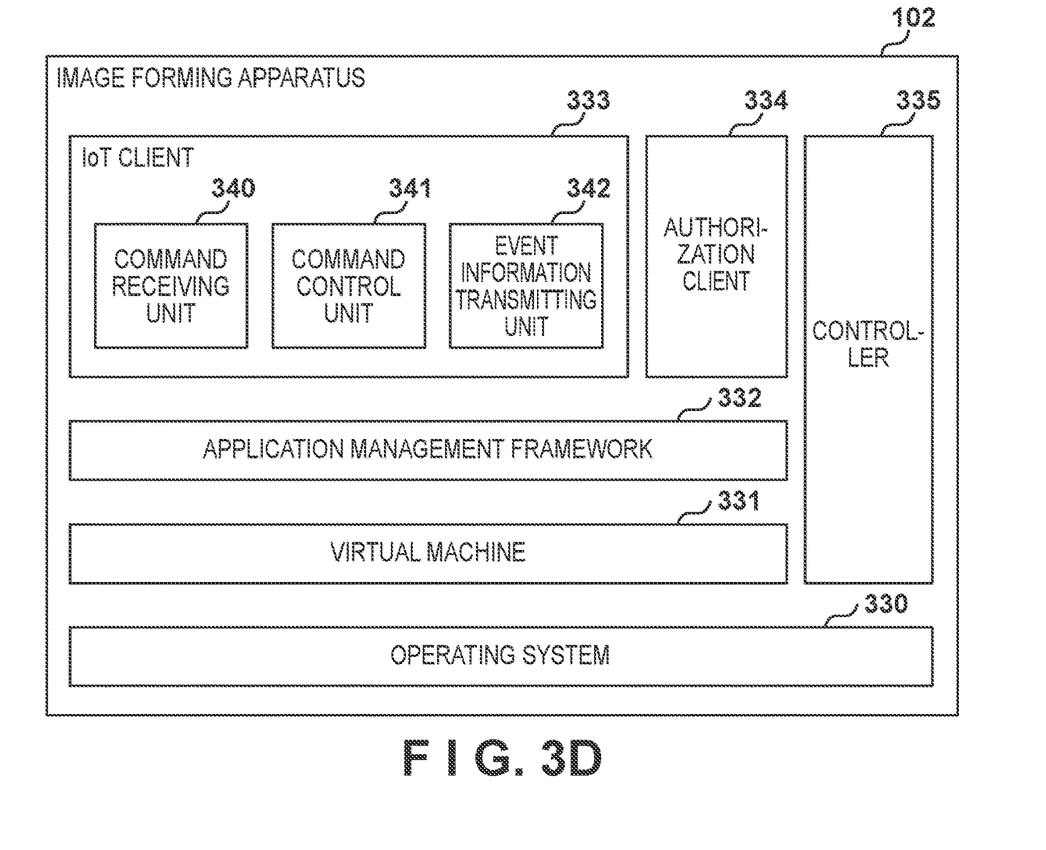

FIG. 3D illustrates a software configuration diagram of the image forming apparatus 102. The image forming apparatus 102 controls each application by the CPU 201 executing an operating system stored in the ROM 202 or the external memory 206. Since a unique identifier has been assigned to the image forming apparatus 102 as a device ID at the time of manufacturing, the image forming apparatus 102 is identified by this device ID.

An operating system (OS) 330 is software that manages the entire image forming apparatus 102. The operating system 330 may be a real-time OS or a general-purpose OS such as Linux®. A virtual machine 331 is a virtual application execution environment that runs on the operating system 330. The virtual machine 331 may be, for example, a Java® VM. An application management framework 332 runs on the virtual machine 331 and has a function for managing the life cycles of applications to be managed. The application management framework 332 may also include an I/F that controls the life cycles of applications and an I/F public function for mediating processing requests between each application. A life cycle is the states of an application including installation, start, stop, and uninstallation of the application. In the present embodiment, OSGi® specified by the OSGi (an abbreviation for Open Services Gateway initiative) Alliance is utilized as the application management framework 332.

An IoT client 333 and the authorization client 334 are applications that operate in an application execution environment provided by the virtual machine 331. These applications are identified by Application IDs. The life cycles of these applications are managed by the application management framework 332. An application running on the application management framework 332 may be installed at the time of manufacturing of the image forming apparatus 102 or may be installed after shipment via the application management framework 332.

The IoT client 333 is a client application of the device management server 103. The IoT client 333 receives push commands from the device management server 103 in a command receiving unit 340. As a communication method for the command receiving unit 340 to receive push commands, there is the push method and the polling method. In the push method, the command receiving unit 340 receives push commands that a server has actively transmitted (in other words, originated from the server) through a pre-established session between the server and the client. In the polling method, the command receiving unit 340 transmits queries (polling) at predetermined communication intervals to a server, and receives push commands as a response. Since communication port numbers are different between the push method and the polling method, the command receiving unit 340 can select a desired communication method by accessing the respective communication port. Further, the command receiving unit 340 can change the communication intervals for polling.

A command control unit 341 performs processing related to push commands from a server. Specifically, the command control unit 341 sends push commands received by the command receiving unit 340 to a controller 335. The command control unit 341 switches the communication method for receiving push commands from a server. Specific details on switching of the communication method will be described later.

The controller 335 is software for controlling functions unique to the image forming apparatus 102. For example, the controller 335 performs processing for functions such as printing, copying, and faxing as well as status management of the image forming apparatus 102. The controller 335 executes printing processing on printing data received from a job execution terminal, and acquires information on events generated by changes in the state of printing processing or the device state. The controller 335 transmits this information as the event information 400 to the device management server 103 via an event information transmitting unit 342.

Types of events include environmental change events, job change events, device status events, and consumable events. An environmental change event is an event that occurs in response to a change in the environment of the image forming apparatus 102, and occurs in response to a change in temperature, humidity, or the like inside the image forming apparatus 102, for example. A job change event is an event that occurs in response to a change in the state of a job of the image forming apparatus 102, and occurs in response to a change, for example, a job changing to printing start, printing, or printing completion. A device status event is an event that occurs in response to the state of a device and occurs in response to an error state or an alert state occurring, for example. A consumable event is an event related to consumables and occurs in response to the remaining amount of consumables becoming small or empty, for example. The controller 335 also receives push commands transmitted from the maintenance server 104 via the device management server 103 and the IoT client 333 and executes the commands indicated in the command content. Examples of push commands include operation information acquisition commands, instruction commands to switch to a power saving mode, all-function stop instruction commands, and restart instruction commands. The following describes the content of the respective commands.

An operation information acquisition command is a command that transmits, to the device management server 103, the status value of each component of the image forming apparatus 102 and environmental information values such as the temperature in the device and the humidity value for a maintenance worker to ascertain an abnormal state in the device. A command to transition to the power saving mode is a command that causes a fixing unit (not shown) and the operation panel 209 in the image forming apparatus 102 to be turned off and causes a transition to a mode in which power consumption is reduced. An all-function stop instruction command is a command that stops all functions such as each function related to printing, copying, and faxing; back-end processing in the image forming apparatus; and requests for printing, copying, and faxing from each job execution terminal. The power consumption of the image forming apparatus 102 can be reduced by executing a command to transition to the power saving mode or an all-function stop command, thereby making it possible to lower the temperature in the device and prevent failure in the device caused by a high temperature. A restart instruction command is a command that instructs the image forming apparatus 102 to restart. Immediately after restarting, the image forming apparatus 102 establishes a connection with the device management server 103 in the push method and prepares for receiving the next push command.

The authorization client 334 is a client application of the authorization server 105. The authorization client 334 acquires an authorization token from the authorization server 105 and provides the authorization token to the IoT client 333. Each time the IoT client 333 accesses the device management server 103 to receive push commands or transmit event information, the IoT client 333 acquires an authorization token from the authorization client 334.

Operation Sequence of Remote Maintenance System

Figure 5:
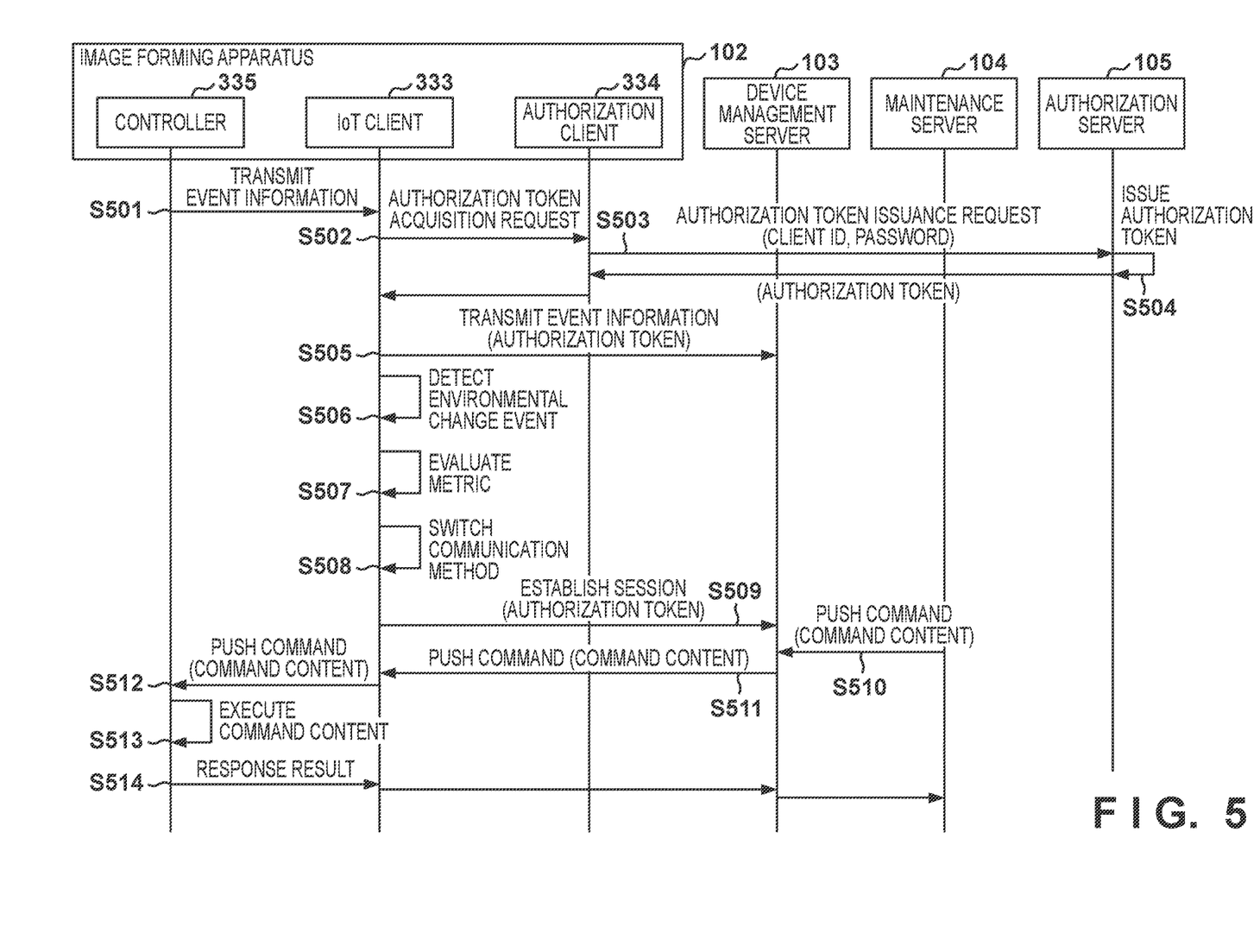
FIG. 5 is a sequence diagram illustrating an example of remote maintenance processing of the first embodiment.

FIG. 5 is an operation sequence of the remote maintenance system. In FIG. 5, an operation example in which an environmental change event related to a temperature change has occurred in the image forming apparatus 102 and the temperature in the image forming apparatus 102 has exceeded a temperature threshold for which maintenance work is necessary will be described.

In step S501, when the controller 335 in the image forming apparatus 102 detects that an environmental change event has occurred in the image forming apparatus 102, the controller 335 sends event information related to the event to the IoT client 333. In step S502, the IoT client 333 issues an authorization token acquisition request to the authorization client 334. In step S503, the authorization client 334 transmits an authorization token issuance request, which includes the client ID and password that it holds, to the authorization server 105. In step S504, the authorization server 105 uses the client information in the above Table 2 and the client ID and password received from the authorization client 334 to generate a record of the authorization token information in the above Table 3. The authorization server 105 then transmits the authorization token to the authorization client 334. The authorization client 334 passes the authorization token to the IoT client 333.

In step S505, the IoT client 333 transmits the event information 400 associated with the authorization token to the device management server 103 via the event information transmitting unit 342. In step S506, the command control unit 341 of the IoT client 333 detects that the transmitted event information is information related to the environmental change event. In step S507, the command control unit 341 compares the metric (in this example, a temperature), which corresponds to the state of the image forming apparatus 102 and pertains to the event that has occurred, with the temperature threshold defined in advance. In step S508, the command control unit 341 determines to switch the method of communication between the device management server 103 and the image forming apparatus 102 to the push method based on the result of comparing the metrics. In step S509, the IoT client 333 establishes a session between the device management server 103 and the image forming apparatus 102 in order to switch the communication method to the push method.

In step S510, the maintenance server 104 transmits a push command, in which a maintenance command is described, to the device management server 103. In step S511, the device management server 103 transmits the push command to the IoT client 333 through the session established with the IoT client 333. In step S512, the command control unit 341 of the IoT client 333 passes the push command to the controller 335. In step S512, the controller 335 executes the content of the push command. In step S513, the controller 335 returns an execution result to the maintenance server 104 via the device management server 103.

In the above example, in step S508, the command control unit 341 has determined to switch the communication method to the push method. Depending on the result of comparing the metrics, the command control unit 341 keeps the communication method to the polling method. In such a case, the push command transmitted from the maintenance server 104 to the device management server 103 in step S510 is queued in the device management server 103. The device management server 103 transmits the queued push command to the image forming apparatus 102 in response to polling from the image forming apparatus 102.

Event Detection Processing by Image Forming Apparatus 102

Figure 6:
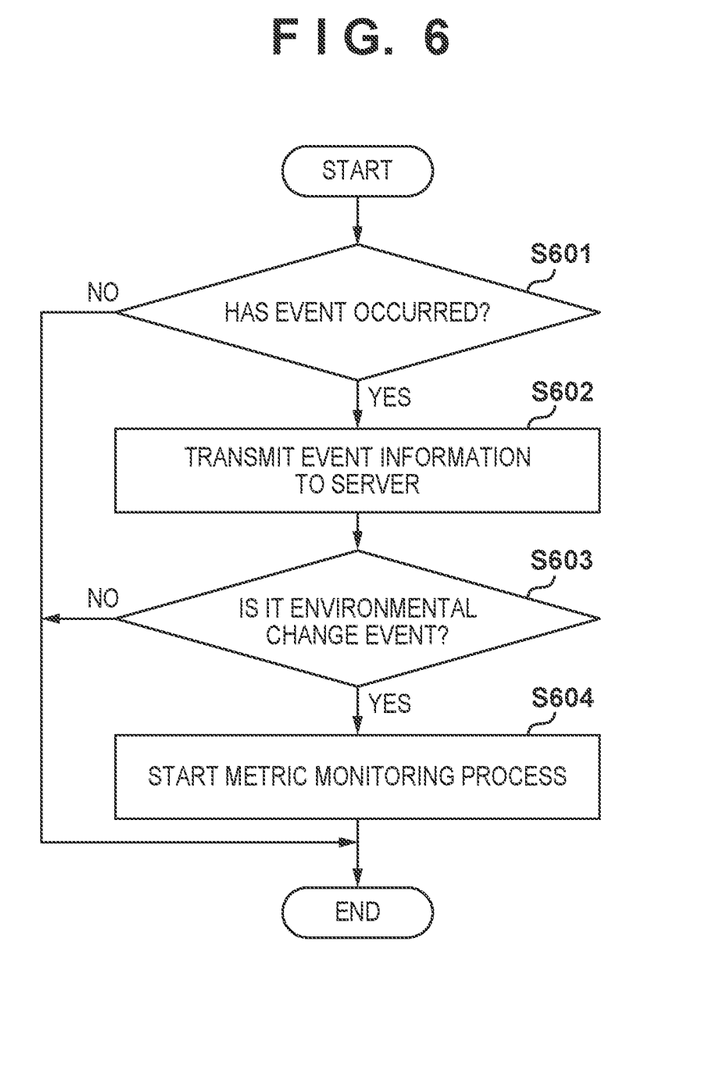
FIG. 6 is a flowchart illustrating an example of event detection processing of the first embodiment.

FIG. 6 is a flowchart illustrating the event detection processing by the image forming apparatus 102. Each step of the method of FIG. 6 is performed by each software module (described above in FIG. 3D) of the image forming apparatus 102. As described above, each software module of the image forming apparatus 102 may be realized by the CPU 201 of the image forming apparatus 102 executing a program read into the RAM 203. The method of FIG. 6 may be started when the image forming apparatus 102 is started.

In step S601, the controller 335 determines whether an event has occurred in the image forming apparatus 102. If it is determined that an event has occurred ("YES" in step S601), the process transitions to step S602; otherwise ("NO" in step S601), the process transitions to step S601. That is, the controller 335 waits until an event occurs and then executes step S602 in response to the event occurring.

In step S602, the event information transmitting unit 342 of the IoT client 333 transmits, to the device management server 103, the event information of the event determined to have occurred in step S601.

In step S603, the event information transmitting unit 342 determines whether or not the event that has occurred in step S601 (that is, an event for which the event information has been transmitted in step S602) is an environmental change event. If it is determined that the event that has occurred is an environmental change event ("YES" in step S603), the process transitions to step S604; otherwise ("NO" in step S603), the process ends. If the event that has occurred is an environmental change event, the command control unit 341 may hold the event information 400 of this event.

In step S604, the command control unit 341 of the IoT client 333 starts a metric monitoring process. The metric monitoring process is processing of monitoring a metric (for example, the temperature inside the image forming apparatus 102), which corresponds to the state of the image forming apparatus 102 and pertains to an event that has occurred, and switching the method of communicating with the device management server 103 as necessary. Details of the metric monitoring process will be described later.

The image forming apparatus 102 may repeatedly execute the method of FIG. 6 while the image forming apparatus 102 is on. The environmental change event determined in step S603 is an example of an event that is a target of remote maintenance. Step S604 may be executed even if other events that are targets of remote maintenance occur. In addition, in the process of FIG. 6, step S603 may be omitted. If step S603 is omitted, step S604 is executed regardless of the type of event.

Metric Monitoring Process by Image Forming Apparatus 102

Figure 7:
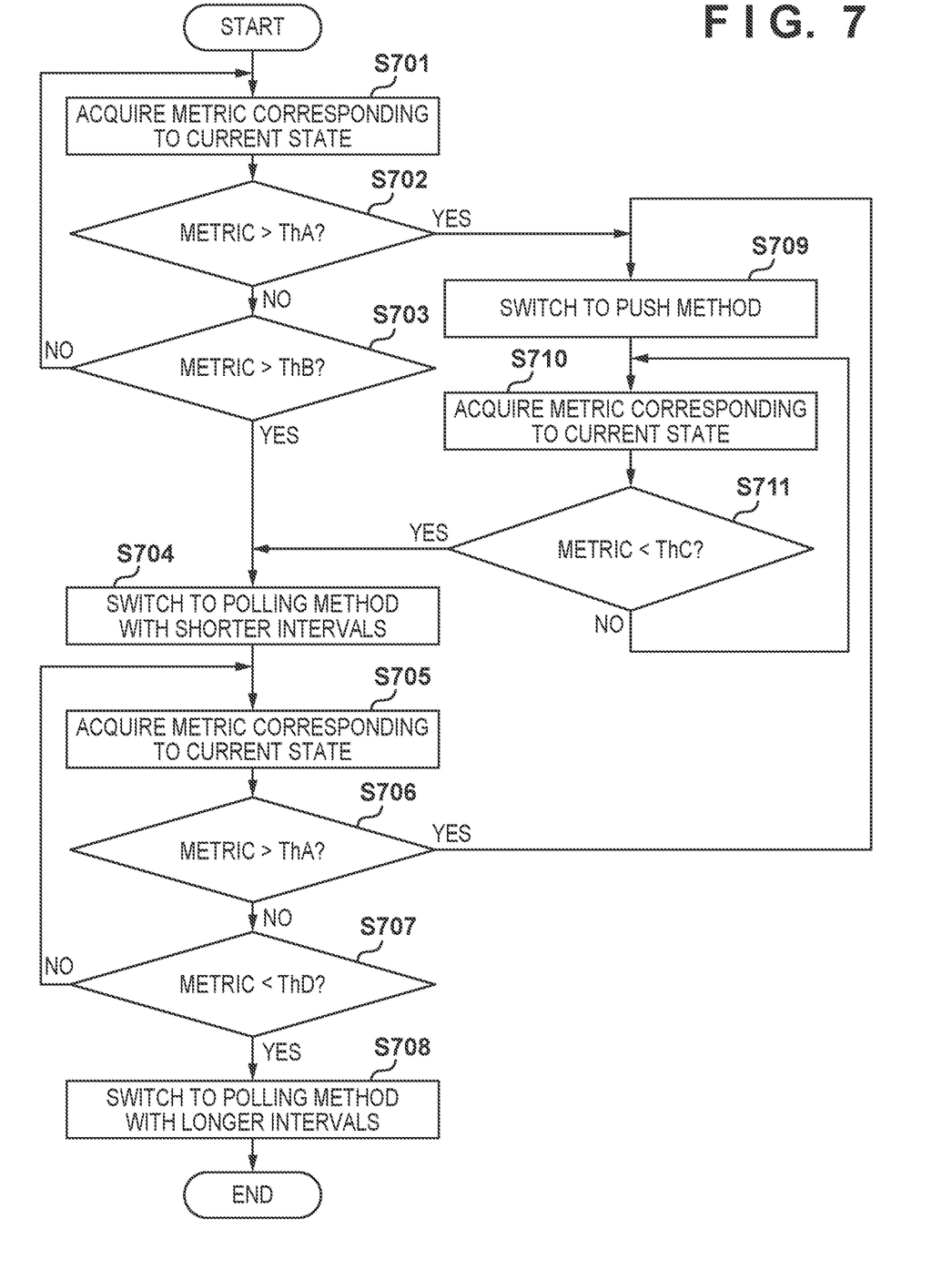
FIG. 7 is a flowchart illustrating an example of metric monitoring processing of the first embodiment.

FIG. 7 is a flowchart illustrating metric monitoring processing by the image forming apparatus 102. Each step of the method of FIG. 7 is performed by each software module (described above in FIG. 3D) of the image forming apparatus 102. As described above, each software module of the image forming apparatus 102 may be realized by the CPU 201 of the image forming apparatus 102 executing a program read into the RAM 203. The process of FIG. 7 may be started in step S604 of FIG. 6.

At the start of the method of FIG. 7, the IoT client 333 is communicating with the device management server 103 in the polling method with longer communication intervals. Here, "longer" communication intervals mean that it is longer than "shorter" communication intervals to be described later.

In step S701, the controller 335 acquires a metric corresponding to the current state of the image forming apparatus 102. The type of metric may vary depending on the event that has occurred. For example, when an event related to a temperature change occurs, the temperature inside the image forming apparatus 102 is acquired as a metric corresponding to the current state of the image forming apparatus 102. As another example, when an event related to a humidity change occurs, the humidity inside the image forming apparatus 102 is acquired as a metric corresponding to the current state of the image forming apparatus 102.

In step S702, the command control unit 341 compares the current metric with a threshold ThA. If it is determined that the current metric has exceeded the threshold ThA ("YES" in step S702), the process transitions to step S709; otherwise ("NO" in step S702), the process transitions to step S703. It is assumed that, in step S702, when the current metric is equal to the threshold ThA, the determination result is No; however, the determination result may be Yes instead. The same applies to the following steps S703, S706, S707, and S711.

When it is determined that the current metric has exceeded the threshold ThA, in step S709, the command control unit 341 switches the method of communicating with the device management server 103 to the push method. Therefore, the threshold ThA is set to a value of a metric for which it is determined that immediate maintenance of the image forming apparatus 102, performed remotely by a maintenance worker, is necessary. The threshold ThA may be stored in advance (for example, at the time of manufacturing) in the storage apparatus 210 of the image forming apparatus 102 or may be acquired or updated after shipment. The same applies to other thresholds, ThB, ThC, and ThD, described below.

In step S703, the command control unit 341 compares the current metric with the threshold ThB. If it is determined that the current metric has exceeded the threshold ThB ("YES" in step S703), the process transitions to step S704; otherwise ("NO" in step S703), the process transitions to step S701.

When it is determined that the current metric has exceeded the threshold ThB, in step S704, the command control unit 341 switches the method of communicating with the device management server 103 to the polling method with shorter communication intervals. In other words, the command control unit 341 shortens the communication intervals of the polling method. Therefore, the threshold ThB is set to a value of a metric for which it is determined that maintenance of the image forming apparatus 102, performed remotely by a maintenance worker, will soon be necessary. The threshold ThB is smaller than the threshold ThA.

If the current metric is less than or equal to the threshold ThB during communication in the polling method with longer communication intervals, the command control unit 341 keeps this communication method. Therefore, steps S701 to S703 are a processing loop performed while the IoT client 333 communicates with the device management server 103 in the polling method with longer communication intervals.

Next, an operation after the communication method is switched in step S704 to the polling method with shorter communication intervals will be described. Similarly to step S701, in step S705, the controller 335 acquires a metric corresponding to the current state of the image forming apparatus 102. In step S706, the command control unit 341 compares the current metric with a threshold ThA. If it is determined that the current metric has exceeded the threshold ThA ("YES" in step S706), the process transitions to step S709; otherwise ("NO" in step S706), the process transitions to step S707. Thus, while the command control unit 341 is communicating with the device management server 103 in the polling method with shorter communication intervals, when the current metric is determined to have exceeded the threshold ThA in step S709, the command control unit 341 switches the communication method to the push method.

In step S707, the command control unit 341 compares the current metric with the threshold ThD. If it is determined that the current metric has fallen below the threshold ThD ("YES" in step S707), the process transitions to step S708; otherwise ("NO" in step S707), the process transitions to step S705.

When it is determined that the current metric has fallen below the threshold ThD, in step S708, the command control unit 341 switches the method of communicating with the device management server 103 to the polling method with longer communication intervals. In other words, the command control unit 341 lengthens the communication intervals of the polling method. Therefore, the threshold ThD is set to a value of a metric for which it is determined that maintenance of the image forming apparatus 102, performed remotely by a maintenance worker, is no longer necessary. The threshold ThD is smaller than the threshold ThA.

The value of the threshold ThD may be the same value as the threshold ThB. Alternatively, the value of the threshold ThD may be smaller than the value of the threshold ThB. By making the value of the threshold ThD smaller than the value of the threshold ThB, it is possible to prevent the communication intervals of the polling method from being excessively switched.

If the current metric is greater than or equal to the threshold ThB and is less than or equal to the threshold ThA during communication in the polling method with shorter communication intervals, the command control unit 341 keeps this communication method. Therefore, steps S705 to S707 are a processing loop performed while the IoT client 333 communicates with the device management server 103 in the polling method with shorter communication intervals.

While the command control unit 341 is communicating in the polling method with shorter communication intervals, a maintenance worker may issue an operation information acquisition command, an instruction command to transition to the power saving mode, or the like to the image forming apparatus 102. By this, the temperature inside the image forming apparatus 102 may be lowered, for example. In addition, there is a possibility that the internal temperature may be lowered by a cooling mechanism such as a fan of the image forming apparatus 102 operating. If the temperature inside the image forming apparatus 102 decreases, the state for which remote maintenance is necessary will be resolved. In such a case, the command control unit 341 returns the communication method to the polling method with longer communication intervals. On the other hand, when the temperature inside the image forming apparatus 102 further increases, the command control unit 341 switches the communication method to the push method in which commands from a maintenance worker are transmitted with shorter delays.

Next, an operation after the communication method is switched in step S709 to the push method will be described. Similarly to step S701, in step S710, the controller 335 acquires a metric corresponding to the current state of the image forming apparatus 102. In step S711, the command control unit 341 compares the current metric with the threshold ThC. If it is determined that the current metric has fallen below the threshold ThC ("YES" in step S711), the process transitions to step S704; otherwise ("NO" in step S711), the process transitions to step S710. Thus, while the command control unit 341 is communicating with the device management server 103 in the push method, when the current metric is determined to have fallen below the threshold ThC, in step S704, the command control unit 341 switches the communication method to the polling method with shorter communication intervals. The threshold ThC is set to a value of a metric for which it is determined that maintenance of the image forming apparatus 102, performed remotely by a maintenance worker, is no longer necessary.

The value of the threshold ThC may be the same value as the threshold ThA. Alternatively, the value of the threshold ThC may be smaller than the value of the threshold ThA. By making the value of the threshold ThC smaller than the value of the threshold ThA, it is possible to prevent excessive switching from the polling method to the push method.

If the current metric is greater than or equal to ThC during communication in the push method, the command control unit 341 keeps this communication method. Therefore, steps S710 and S711 are a processing loop performed while the IoT client 333 communicates with the device management server 103 in the push method.

While the command control unit 341 is communicating in the push method, a maintenance worker may issue an operation information acquisition command, an all-function stop instruction command, a restart instruction command, or the like to the image forming apparatus 102. This may resolve the state in which remote maintenance is necessary. In such a case, the command control unit 341 returns the communication method to the polling method with shorter communication intervals.

In the above method, while the command control unit 341 is communicating with the device management server 103 in the push method, even if the metric has fallen below the threshold ThD, the command control unit 341 switches the communication method to the polling method with shorter communication intervals without switching to the polling method with longer communication intervals. By transitioning to the polling method with shorter communication intervals as described above, when a situation in which additional maintenance is necessary immediately after maintenance arises, the image forming apparatus 102 can receive push commands with smaller delays. Therefore, after the communication method is switched from the push method to the polling method with shorter communication intervals, the command control unit 341 may be prevented from switching to the polling method with longer communication intervals until a predetermined condition is met. The predetermined condition may be an instruction from a maintenance worker or an elapsation of a predetermined time.

On the other hand, in the above method, while the command control unit 341 is communicating with the device management server 103 in the polling method with longer communication intervals, when the metric exceeds the threshold ThA, the command control unit 341 directly switches to the push method without passing through the polling method with shorter communication intervals. This can reduce the time it takes to receive push commands when immediate maintenance is necessary.

In the above method, the communication intervals for when switching from the polling method with longer communication intervals to the polling method with shorter communication intervals and the communication intervals for when switching from the push method to the polling method with shorter communication intervals may be the same, or different. For example, in the former case, it is considered that there is a higher possibility of switching to the push method than in the latter case. Therefore, the communication intervals in the former case may be made shorter than the communication intervals in the latter case.

The threshold ThA may be a different value for each type of metric to be compared therewith. For example, the values of threshold ThA may be different from each other for when the metric is temperature and for when the metric is humidity. The same applies to other thresholds, ThB, ThC, and ThD.

The method of FIG. 7 may also be performed in parallel with the method of FIG. 6. That is, during the execution of the metric monitoring processing in FIG. 7, the event detection processing of FIG. 6 may be repeatedly executed, and thereby a new event may be detected. As a result, the method of FIG. 7 may be performed for a plurality of different metrics. In that case, the communication method may be selected by giving priority to the metric for which there a higher necessity for maintenance.

As described above, according to the present embodiment, when an environmental change event occurs in the image forming apparatus 102, a metric corresponding to the state of the image forming apparatus 102 is compared with each of the plurality of threshold values. Based on the result of comparison, the method of communicating with the device management server 103 is switched between three communication methods (the polling method with longer communication intervals, the polling method with shorter communication intervals, and the push method). Thus, the communication method between the image forming apparatus 102 and the device management server 103 can be appropriately switched. As a result, push commands can be received at appropriate timings in the image forming apparatus 102.

Second Embodiment

Figure 8A:
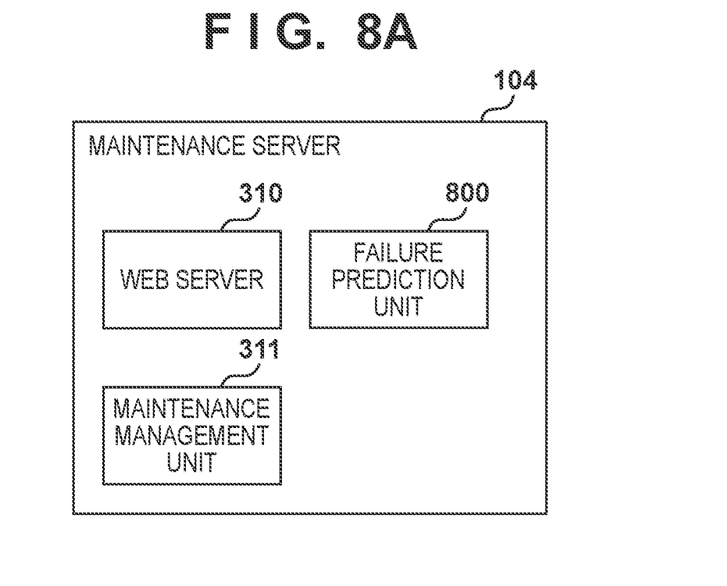
FIGS. 8A and 8B are block diagrams illustrating examples of software configurations of a maintenance server of a second embodiment.
Figure 8B:
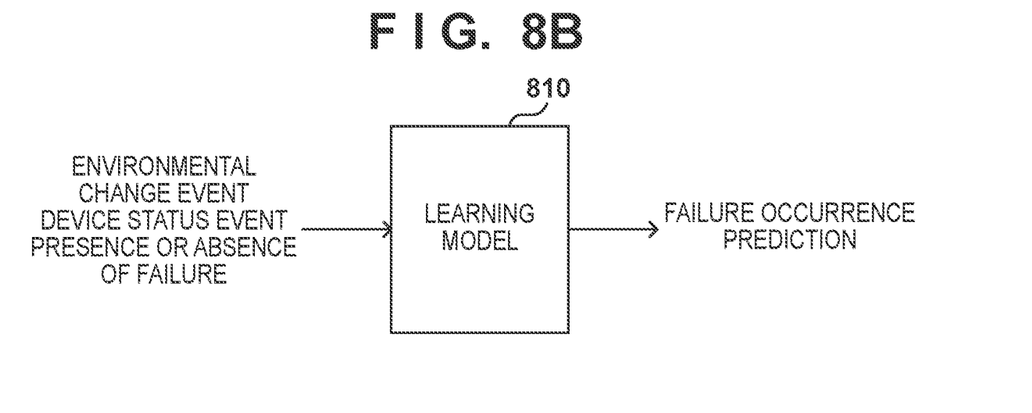
Figure 9:
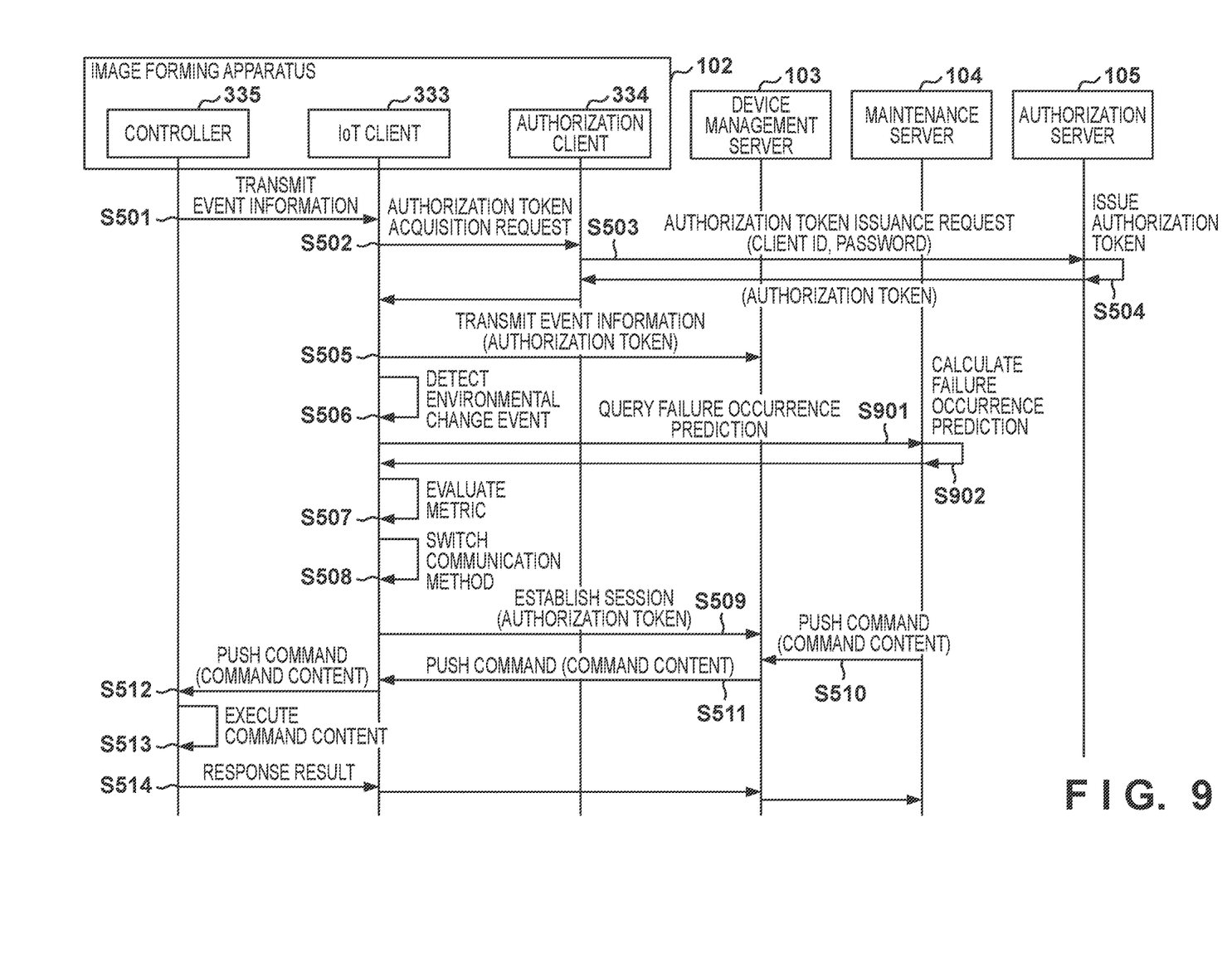
FIG. 9 is a sequence diagram illustrating an example of remote maintenance processing of the second embodiment.

Referring to FIGS. 8A to 9, description will be given for a remote maintenance system related to a second embodiment. In the second embodiment, when the image forming apparatus 102 switches the communication method, the image forming apparatus 102 uses, as information for determining an abnormality, a failure occurrence prediction generated by the maintenance server 104.

FIG. 8A illustrates an example of a software configuration of the maintenance server 104. Compared to the first embodiment, the maintenance server 104 further includes a failure prediction unit 800. The failure prediction unit 800 predicts failure of the image forming apparatus 102 using a learning model 810 illustrated in FIG. 8B. The learning model 810 takes the event information 400 and failure information of the image forming apparatus 102 as input (feature amounts) and generates a failure occurrence prediction value as an output (objective variable). The learning model 810 is obtained by prior machine learning. Algorithms for machine learning can be a neural network, a naive Bayes method, a support vector machine, and the like. The event information 400 inputted to the learning model 810 may be an environmental change event, which indicates the type and occurrence status of the device status event such as an error or an alert that occurs in the image forming apparatus 102, an internal temperature value at that time, and the presence or absence of failure.

FIG. 9 is an operation sequence of the remote maintenance system. In FIG. 9, an operation example in which an environmental change event related to a temperature change has occurred in the image forming apparatus 102 and the temperature in the image forming apparatus 102 has exceeded a temperature threshold for which maintenance work is necessary will be described.

Since steps S501 to S506 may be the same as that of the first embodiment, redundant description will be omitted. In step S901, the IoT client 333 transmits, to the maintenance server 104 via the device management server 103, an environmental change event and an alert or error event occurring at that time. In step S902, the failure prediction unit 800 of the maintenance server 104 calculates the failure occurrence prediction value by applying the received data to the learning model 810. Thereafter, the maintenance server 104 returns that prediction value to the IoT client 333 via the device management server 103. The image forming apparatus 102 uses this prediction value as a metric corresponding to the state of the image forming apparatus 102 and pertaining to the event that has occurred. Since steps S507 to S514 may be the same as that of the first embodiment, redundant description will be omitted. Since event detection processing and metric monitoring processing in the second embodiment may be the same except that the failure occurrence prediction value that the failure prediction unit 800 of the maintenance server 104 has generated is used as a metric, redundant description will be omitted.

Also in the second embodiment, the method of communication between the image forming apparatus 102 and the device management server 103 can be appropriately switched. As a result, push commands can be received at appropriate timings in the image forming apparatus 102. Also, since the failure occurrence prediction value obtained by machine learning is used as a metric, the timing of switching becomes more appropriate.

In the above embodiments, an image forming apparatus (image processing apparatus) has been used as an example of a network device. The above embodiments can also be applied to other network devices, such as projectors, network cameras, portable information terminals, sensors, and the like.

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2021-037644, filed Mar. 9, 2021, which is hereby incorporated by reference herein in its entirety.

What is claimed is:

1. A network device operable to communicate with a server, the device comprising at least one processor circuit and a memory comprising instructions, that when executed by the processor circuit, cause the processor circuit to:
transmit, to the server, information of an event that has occurred in the network device;
compare, with each of a first threshold and a second threshold that is greater than the first threshold, a metric that corresponds to a state of the network device pertaining to the event; and
switch a method of communicating with the server based on a result of the comparison, wherein the instructions causes the processor circuit to:
in a case where the metric exceeds the first threshold while communicating with the server in a polling method with first communication intervals and where the metric is smaller than the second threshold, switch the method of communicating with the server to a polling method with second communication intervals that are shorter than the first communication intervals, and in a case where the metric is smaller than the first threshold and the second threshold while communicating with the server in the polling method with the first communication intervals, maintain the polling method with the first communication intervals, and in a case where the metric exceeds the second threshold while communicating with the server in the polling method with the second communication intervals, switch the method of communicating with the server to a push method.

2. The network device according to claim 1, wherein the instructions cause the processor circuit to, in a case where the metric falls below a third threshold while communicating with the server in the push method, switch the method of communicating with the server to a polling method with third communication intervals that are shorter than the first communication intervals.

3. The network device according to claim 2, wherein the instructions cause the processor circuit to, in a case where the metric falls below a fourth threshold while communicating with the server in the polling method with the third communication intervals, switch the method of communicating with the server to the polling method with the first communication intervals.

4. The network device according to claim 3, wherein the instructions cause the processor circuit to, even in a case where the metric falls below the fourth threshold while communicating with the server in the push method, cease to switch the method of communicating with the server to the polling method with the first communication intervals.

5. The network device according to claim 1, wherein the instructions cause the processor circuit to, in a case where the metric exceeds the second threshold while communicating with the server in the polling method with the first communication intervals, switch the method of communicating with the server to the push method.

6. The network device according to claim 1, wherein the instructions cause the processor circuit to, in a case where the metric falls below a fifth fourth threshold while communicating with the server in the polling method with the second communication intervals, switch the method of communicating with the server to the polling method with the first communication intervals.

7. The network device according to claim 1, wherein the instructions further cause the processor circuit to:
determine whether or not the event that has occurred in the network device is an event that is a target of remote maintenance; and
in a case where the event that has occurred in the network device is an event that is a target of remote maintenance, switch the method of communicating with the server based on the result of the comparison.

8. The network device according to claim 1, wherein the network device is an image processing apparatus.

9. The network device according to claim 1, wherein the instructions cause the processor circuit to:
in a case where the metric falls below a third threshold while communicating with the server in the push method, switch the method of communicating with the server to a polling method with third communication intervals that are shorter than the first communication intervals;
in a case where the metric falls below a fourth threshold while communicating with the server in the polling method with the third communication intervals, switch the method of communicating with the server to the polling method with the first communication intervals; and
even in a case where the metric falls below the fourth threshold while communicating with the server in the push method, cease to switch the method of communicating with the server to the polling method with the first communication intervals.

10. The network device according to claim 2, wherein the third threshold is the same as or smaller than the second threshold.

11. The network device according to claim 3, wherein the fourth threshold is the same as or smaller than the first threshold.

12. The network device according to claim 6, wherein the fourth threshold is the same as or smaller than the first threshold.

13. A non-transitory storage medium comprising instructions that, when executed by one or more processor of a network device operable to communicate with a server, cause the processor to:
transmit, to the server, information of an event that has occurred in the network device;
compare, with each of a first threshold and a second threshold that is greater than the first threshold, a metric that corresponds to a state of the network device pertaining to the event; and
switch a method of communicating with the server based on a result of the comparison, the switching of the method of communicating with the server including;
in a case where the metric exceeds the first threshold while communicating with the server in a polling method with first communication intervals and where the metric is smaller than the second threshold, switching the method of communicating with the server to a polling method with second communication intervals that are shorter than the first communication intervals, and in a case where the metric is smaller than the first threshold and the second threshold while communicating with the server in the polling method with the first communication intervals, maintaining the polling method with the first communication intervals, and in a case where the metric exceeds the second threshold while communicating with the server in the polling method with the second communication intervals, switching the method of communicating with the server to a push method.

14. A method of controlling a network device operable to communicate with a server, the method comprising:
transmitting, to the server, information of an event that has occurred in the network device;
comparing, with each of a first threshold and a second threshold that is greater than the first threshold, a metric that corresponds to a state of the network device pertaining to the event;
and switching a method of communicating with the server based on a result of the comparison, wherein the switching of the method of communication includes:
in a case where the metric exceeds the first threshold while communicating with the server in a polling method with first communication intervals and where the metric is smaller than the second threshold, switching the method of communicating with the server to a polling method with second communication intervals that are shorter than the first communication intervals, and in a case where the metric is smaller than the first threshold and the second threshold while communicating with the server in the polling method with the first communication intervals, maintaining the polling method with the first communication intervals, and in a case where the metric exceeds the second threshold while communicating with the server in the polling method with the second communication intervals, switching the method of communicating with the server to a push method.

* * * * *